United States Patent [19]

van der Lely

[11] Patent Number: 4,730,446
[45] Date of Patent: Mar. 15, 1988

[54] BALERS

[75] Inventor: Cornelis van der Lely, Zug, Switzerland

[73] Assignee: Texas Industries Inc., Curacao, Netherlands Antilles

[21] Appl. No.: 811,721

[22] Filed: Dec. 20, 1985

Related U.S. Application Data

[62] Division of Ser. No. 676,307, Nov. 29, 1984, abandoned.

[30] Foreign Application Priority Data

Dec. 1, 1983 [NL] Netherlands ............... 8304136

[51] Int. Cl.⁴ .................................. A01D 39/00
[52] U.S. Cl. ............................. 56/341; 100/88
[58] Field of Search ............ 56/341, DIG. 6, 432; 100/3, 4, 5, 47, 88, 89

[56] References Cited

U.S. PATENT DOCUMENTS

| | | | |
|---|---|---|---|
| 3,901,007 | 8/1975 | Blanshine et al. | 56/341 |
| 3,910,178 | 10/1975 | Eggers et al. | 100/88 |
| 4,229,934 | 10/1980 | Berky | 56/341 |
| 4,244,166 | 1/1981 | Hayward | 100/88 |
| 4,259,900 | 4/1981 | Campbell et al. | 100/38 |
| 4,425,753 | 1/1984 | Freimuth | 56/341 |
| 4,457,226 | 7/1984 | Meiers | 56/341 |

*Primary Examiner*—Stephen J. Novosad
*Assistant Examiner*—Bruce M. Kisliuk
*Attorney, Agent, or Firm*—Penrose Lucas Albright

[57] ABSTRACT

A baler has winding elements for forming a bale of crop. A formed bale is bound with binding material such as twine or wire from a binding mechanism. When a bale is fully formed, a cable is pulled by the operator of the tractor towing the baler which actuates the binding mechanism and simultaneously operates a change-speed gear to increase the speed of the winding elements. The bale thus rotates faster during binding than it does while it is being formed. This reduces time required for binding. When the bale has been bound, it is discharged through a door which pivots upwards for this purpose. Pivoting of the door pulls a further cable which returns the change-speed gear to the lower speed position and actuates the binding mechanism so that the next bale can be formed. The bale chamber is substantially cylindrical with rotable elements around the interior of its curved sides. One group of such elements is pivotable about a pivot axis adjacent the baler's pick-up device and bears on the forming bale to assist in its formation and ensure it is sufficiently compressed. The individual rotatable elements are rods or tubes or a plurality of same spaced from and arranged to rotate about a common axis, such plurality being parallel to coincide with a cylindrical surface, or helical to coincide with a hyperboloidal surface relative to its axis of rotation.

22 Claims, 6 Drawing Figures

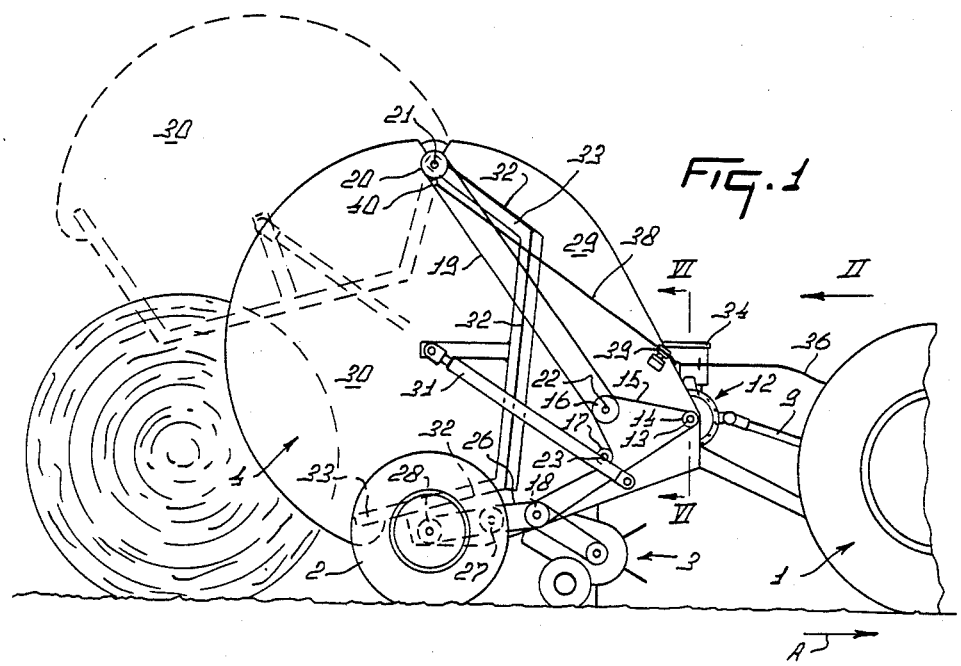
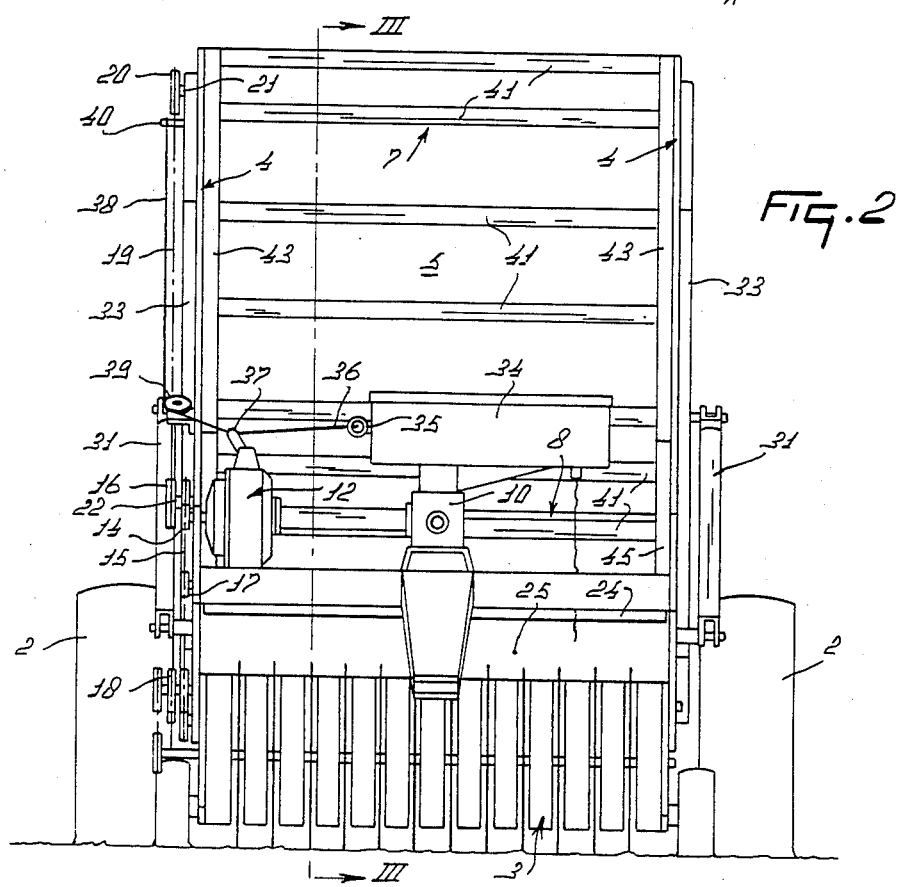

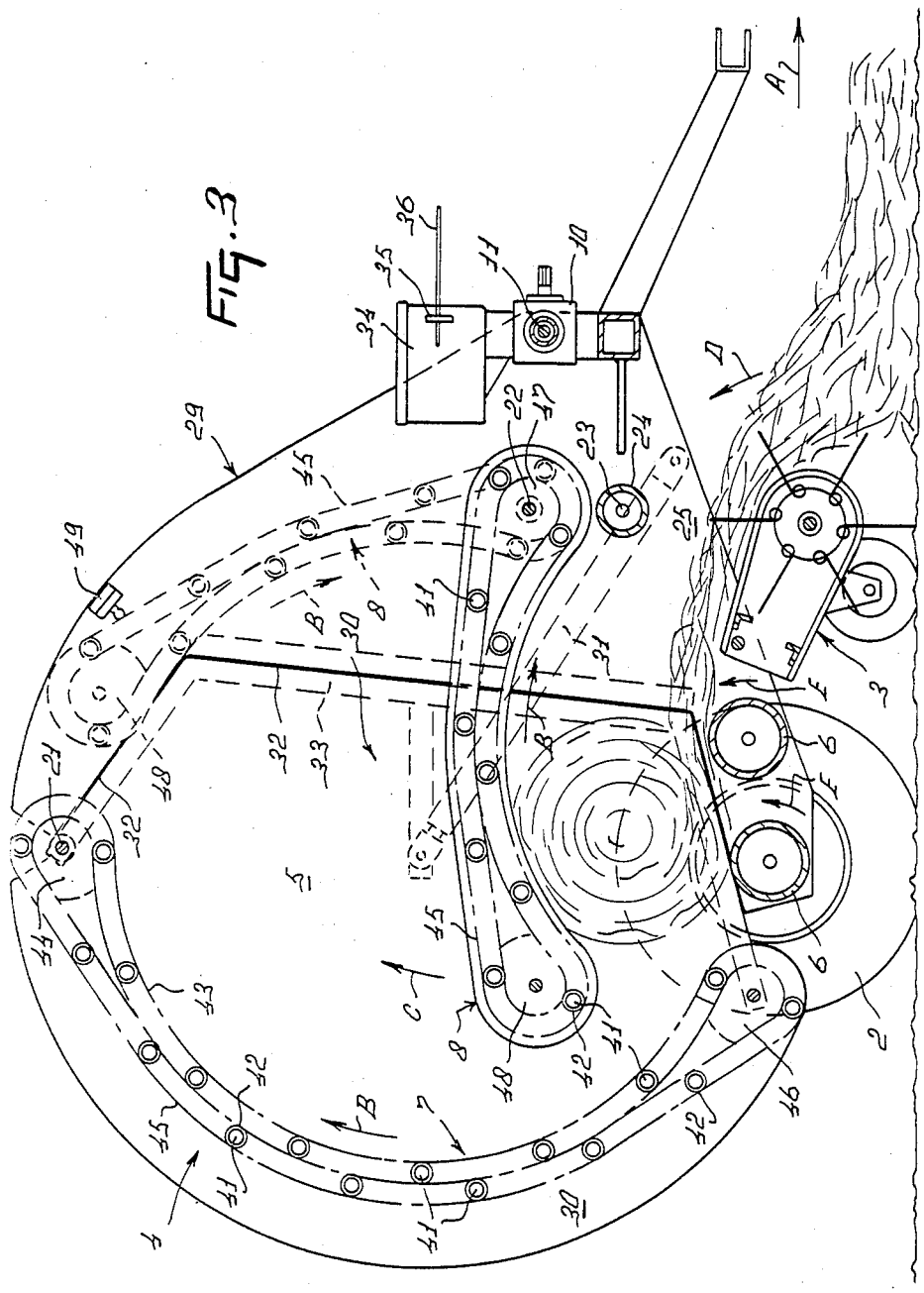

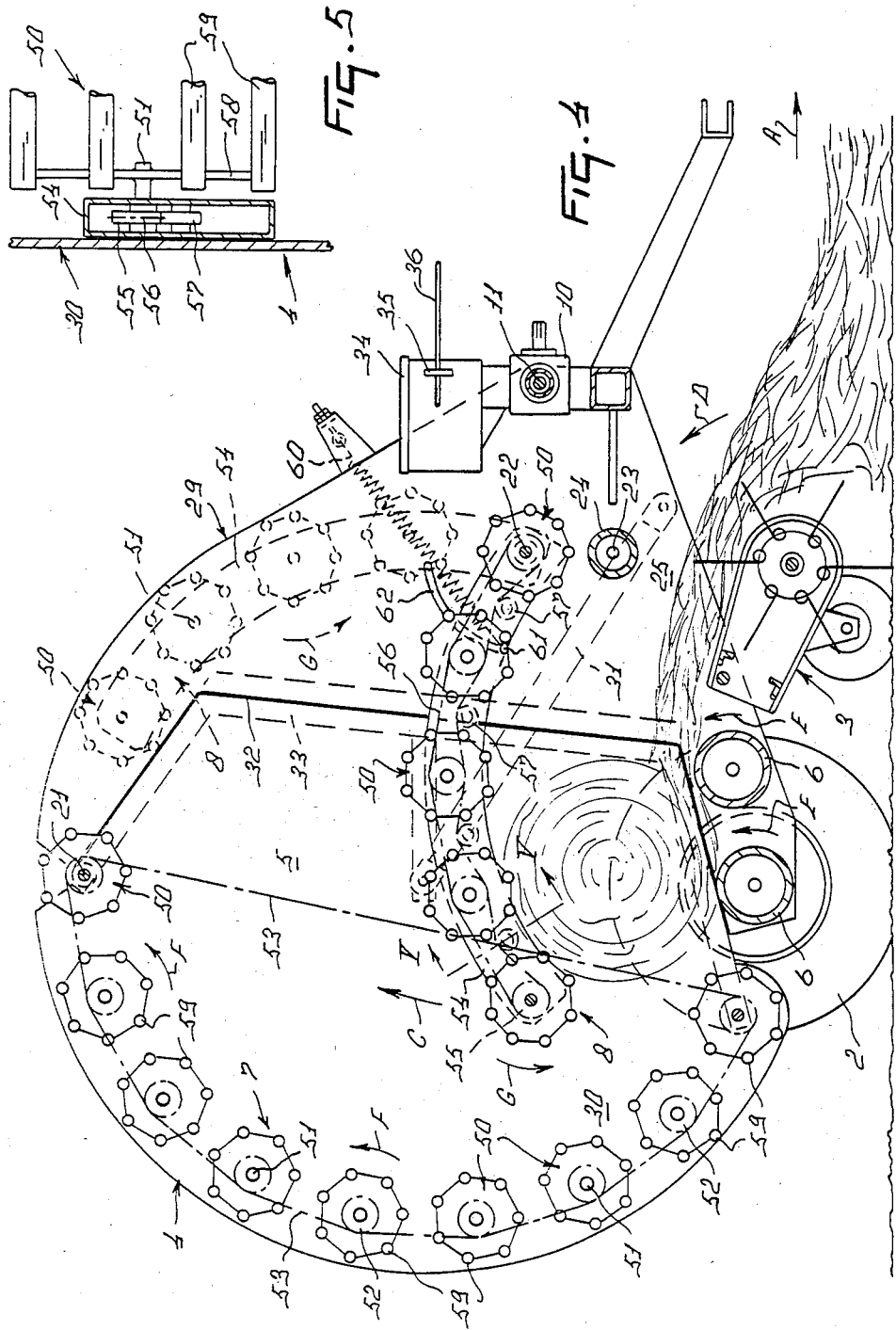

BALERS

This is a division of application Ser. No. 676,307, filed Nov. 29, 1984 now abandoned.

FIELD OF THE INVENTION

This invention relates to balers.

AND PRIOR ART

This invention relates to balers.

In known balers, the formed bales have to be bound with, for example, twine or wire before they are discharged from the baler. The purpose of binding is to avoid disintegration of the bales while they are left on the field. Known balers are stopped while binding proceeds. Since, during binding, the bale remains in the space where it has been formed and in which the next bale will be formed, the formation of the next bale cannot begin until the previous bale has been discharged. This binding time is comparable in length with the time required to form a bale so that considerable loss of time occurs.

SUMMARY OF THE INVENTION

According to one aspect of the present invention there is provided a baler comprising a pick-up device for picking up crop lying on the ground, and a bale forming space provided with winding elements which can be driven at at least two different speeds.

In this way the formed bale can be rolled at a relatively high speed in the bale forming space while it is bound. When binding is complete the bale is discharged and the drive of the winding elements is continued at the normal lower rate to form the next bale. In this way the time required for binding a bale can be minimized.

According to a second aspect of the present invention there is provided a baler comprising a pick-up up device for picking up crop from the ground, and at least one winding element provided with drivable elongate crop displacing members, which are rotatable about an axis.

According to a third aspect of the present invention there is provided a baler comprising a pick-up device for picking up crop from the ground and a coiling space defined, during bale formation, by a boundary of which about one quarter or more is pivotably mounted with respect to the rest of the baler.

According to a fourth aspect of the present invention there is provided a baler comprising a pick-up device for picking up crop from the ground, and at least one side wall having a portion which extends beyond a centerline of a bale forming space and which can be pivoted outwardly in common with a rear wall.

BRIEF DESCRIPTION OF THE DRAWINGS

FIG. 1 is a side view of a baler;

FIG. 2 is a front view on an enlarged scale taken in the direction of the arrow II in FIG. 1;

FIG. 3 is a sectional view taken on the line III—III in FIG. 2;

FIG. 4 corresponds to FIG. 3 but shows an alternative embodiment;

FIG. 5 is a schematic sectional view taken on the line V—V in FIG. 4; and

DETAILED DESCRIPTION OF PREFERRED EMBODIMENTS

Figure 6:
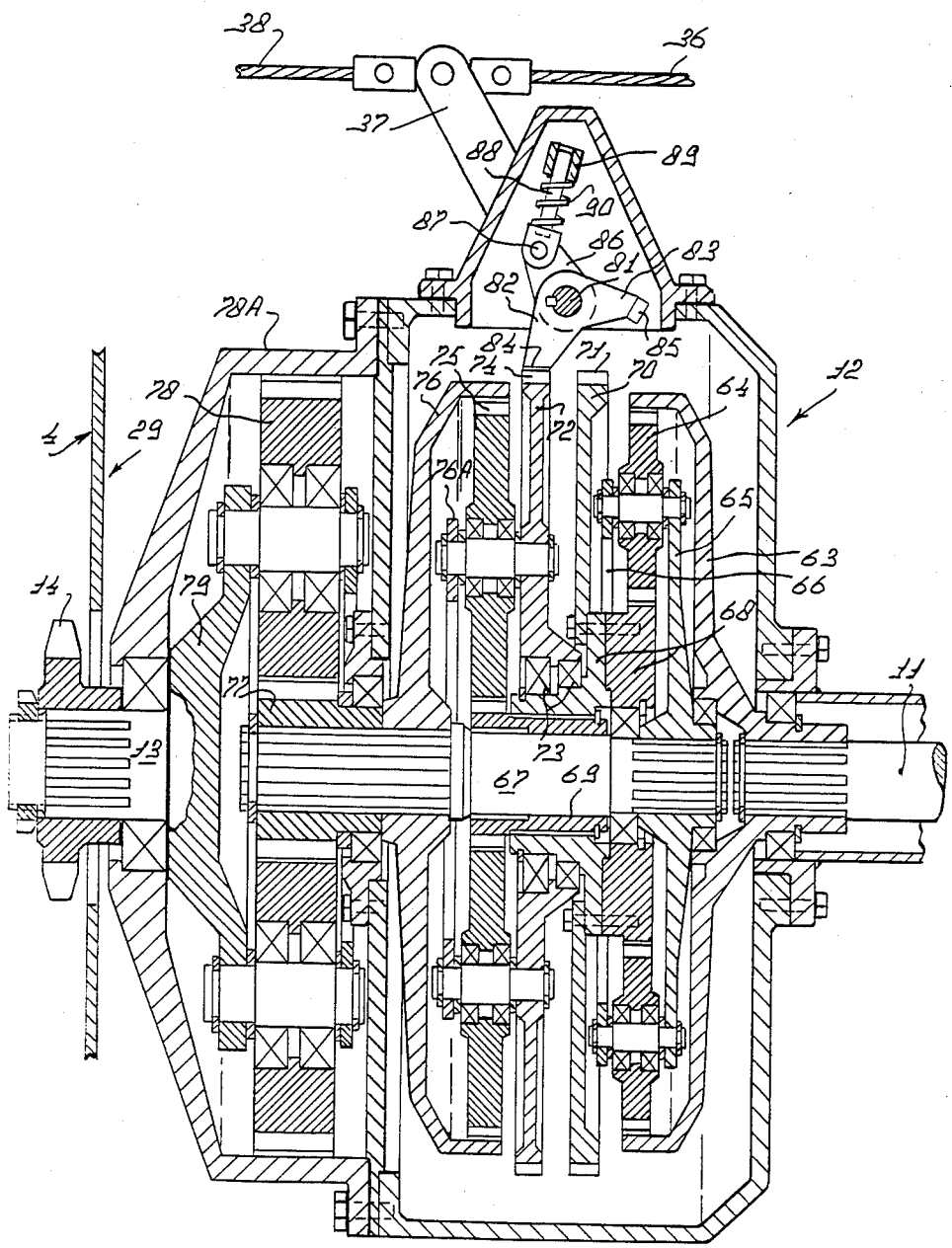
FIG. 6 is a sectional view taken on the line VI—VI in FIG. 1.

The baler or coiling press shown in FIGS. 1 to 3, in operation, forms cylindrical bales of agricultural crop having a diameter of about 150 to 180 centimeters or more and a width of about 120 to 150 or more. The baler is drawn along and powered by an agricultural tractor 1, running on ground wheels 2 provided at both sides of the baler. In its lower front region there is a pick-up device 3 for picking up crop lying on the field and for feeding the picked-up crop rearwardly and upwardly. The pick-up device 3 is of a construction known per se.

The baler comprises two side walls 4, which are constituted by mutually parallel plates, spaced apart transversely of the intended direction of operative travel A. Between the side walls 4 is defined a coiling space 5.

In both embodiments of FIGS. 3 and 4, the coiling space 5 is bounded at the bottom, rear, top and front (at least when it contains a completed bale) by lower driving rollers 6, rear winding elements 7 and front winding elements 8. The rollers 6 and the winding elements 7 and 8 can all be powered from the tractor. Drive to the rollers and the winding elements is transmitted from the front of the baler on the outboard side of one of the side walls 4.

An auxiliary shaft 9 connected with a power takeoff shaft of the tractor 1 provides the input to a drive casing 12 situated at the front of the baler and provided with an orthogonal or bevel gear wheel transmission. An output shaft 11 of the drive casing 10 projects horizontally and transversely of the direction A towards one side of the baler. The output shaft 11 constitutes an input shaft for a two-speed change-speed gearbox 12 (FIGS. 1 and 2), which will be described more fully later. The gearbox 12 has an output shaft 13 aligned with the shaft 11 and projecting through one of the side walls 4. The output shaft 13 carries a sprocket 14, which is parallel to and on the outboard side of the plane of the adjacent side wall 4. A chain 15 runs over the sprocket 14 and over a double sprocket 16 disposed approximately directly behind the sprocket 14. From the double sprocket 16 the chain runs over a sprocket 17 which is disposed approximately perpendicularly below the sprocket 16, then over a sprocket 18 situated near the suspension gear of the pick-up device 3 but supported by the main body of the baler, and then back to the sprocket 14. The sprocket 18 is a triple sprocket. A sprocket 20 situated near the top of the baler is driven from the other sprocket of the double sprocket 16 by means of as chain 19, the shaft 21 of the sprocket 20 serves as a drive shaft for the rear winding elements 7 in the embodiments shown in FIGS. 3 and 4. The shaft 22 of the sprocket 16 serves as a drive shaft for the front winding elements of FIGS. 3 and 4. The sprocket 17 is mounted on a shaft 23 which serves as a drive shaft for a preferably smooth pressing roller 24 (FIGS. 3 and 4) which, with the pick-up device 3, define a crop feeding opening 25.

A chain 26 runs over one of the wheels of the triple socket 18 and drives two successive sprockets 27 and 28 both disposed behind the sprocket 18. The rotary shafts of the sprockets 27 and 28 extend from one side wall 4 to the other and carry the two lower driving rollers 6, which at least partially define the floor of the winding space 5. A further chain running over the third wheel of the triple socket 18 drives the pick-up device 3.

Each of the two side walls 4 laterally bounding the winding space 5 is divided into two sections, namely a front section 29 and a rear section 30 (FIG. 1). The front section 29 of each side wall 4 is rigidly secured to the frame of the baler but the rear sections 30 of the two side walls 4, which are interconnected by the rear winding elements 7, are pivotable together with respect to the front section 29 about the shaft 21. The shaft 21, as viewed from the side, is situated near the uppermost point of the cylindrical winding space 5. The centerline of the shaft 21 thus constitutes a pivotal axis for a door comprising the rear section 30 and the winding element 7. The door is pivotable about the shaft 21 from a closed position indicated in FIG. 1 by solid lines into an open position indicated in FIG. 1 by broken lines. This pivotal movement of the door 7, 30 is effected by hydraulic rams 31, which are actuable from the tractor. These two hydraulic rams 31 are provided one on each side of the baler. At the front, each hydraulic ram is pivotally connected to the front section 29 near the bearing of the pressing roller 24 in the lower front region of the baler. From this connection point the ram slopes rearwardly and upwardly, and its other end is connected to the rear section 30 at a point approximately on the centerline of the cylindrical winding space 5. The centerline of the two hydraulic rams 31 are spaced from the pivotal axis 21 as viewed from the side.

As stated above, the side walls 4 constitute lateral boundaries of the cylindrical winding space 5. The division of these lateral boundaries into the sections 29 and 30 is such that the stationary front section 29 is smaller than the pivotable rear section 30. The pivotable rear section 30 of each lateral boundary of the winding space 5 occupies more than two thirds, and in this embodiment about three quarters, of the total area of the lateral boundary of the winding space 5. For this purpose each side wall 4 has a line of division 32 which initially extends forwardly and downwardly from the shaft 21 at the top of the lateral boundaries, then extends downwardly and slightly rearwardly, and then, at the level of the tops of the rollers 6, it extends rearwardly and slightly downwardly towards the underside of the rear winding elements 7. A stiffening hollow profile 33 is provided on the rear section 30 along the whole line of division 32, this profile 33 also receiving the forces exerted by the hydraulic rams 31 when opening the door 7, 30 during discharge of a bale from the baler.

The baler is also provided with a device for binding a bale which is complete or almost complete in the winding space 5. This binding device comprises a housing 34 for accommodating twine, wire, wrapping sheet material or other binding material, disposed on the front of the baler and centrally above the inlet opening 25. The housing 34 contains twine, wire or sheet material wound on one or more bobbins or spools, by which the bale is bound around its cylindrical extent before leaving the winding space 5. The binding device is of a type known per se and comprises, in a mannner not shown in detail, binding means in the form of a tubular member through which passes the free end of a wire hanging down into the inlet opening 25 as far as the top of the pick-up device 3. This free end is entrained by the crop passing inwards at an instant when the bale is almost completely formed. The tubular member is reciprocated to wind the binding wire along the whole cylindrical width of the bale, after which the wire is automatically severed. The cutting device for automatically severing the wire is considered per se part of the binding device and is incorporated within the housing 34.

An eyelet or pulley 35 is provided on the side of the housing 34 facing that side of the baler on which is situated the chain drive shown in FIG. 1. The eyelet or pulley 35 receives a control cable or cord 36, which extends forwards from the eyelet 35 and terminates near the driver's seat on the tractor 1. The flexible cable 36 extends laterally of the baler from the eyelet 35 in a horizontal direction at right angles to the direction A as far as the free end of a lever 37, which is a control member for the two-speed gear box 12 provided at the front of the baler near one side. The cable 36 is fastened to the free end of the lever 37. At the same place, a second cable is fastened to the lever 37 and this cable 38 extends from the lever 37 first laterally and then, after being deflected around a pulley 39, in a direction parallel to the adjacent side wall 4. From the pulley 39 the cable slopes rearwardly and upwardly (FIG. 1), and its rear, upper end is fastened to a point 40 on the pivotable rear section 30 of the wall 4. The fastening point is some distance below the shaft 21. While a bale is being wound in the winding space 5, the door 7, 30 is closed and the cable 38 is slack between the pulley 39 and the fastening point 40. Near the eyelet 35 the cable 36 is branched towards a control member of the binding device.

When a bale is almost complete in the winding space 5 so that it almost fills the winding space, a signal is automatically passed to the tractor driver in a manner to be described more fully later. The tractor driver then pulls the cable 36 so that the lever 37 is turned clockwise from the position shown in FIG. 2 into a second position. In the first position shown in FIG. 2 the driving rollers 6 and the winding elements 7 and 8 are driven at a comparatively low speed, in a manner to be described later, while the bale is being formed. In the second position of the lever 37, the driving rollers 6 and the winding elements 7 and 8 are driven at a higher second speed. The second driving speed is about twice the first driving speed or a multiple thereof. When the lever 37 is changed over a short time before the completion of the bale in the winding space 5, and the rollers 6 and the winding elements 7 and 8 are driven at the second higher speed, the control member of the binding means is actuated by the above-mentioned branch of the cable 36 so that twine is fed from the housing 34 in the manner described above to the introduced crop and is wound around the rotating bale. The cable 36 thus constitutes an actuating means for setting a higher driving speed of the winding elements and for actuating the binding device. During the winding of the twine or wire around the bale in the winding space 5, the bale is rotated in the winding space 5 at a higher speed than during its formation, so that the time required for binding is appreciably reduced. Thus the disadvantage of known balers of this kind, namely the fact that the time required for binding the bale is of the same order of magnitude as the time required to form the bale, is avoided. The known baler has to be stopped in order to carry out the operation of winding twice around the bale. This means considerable loss of time. By driving the driving rollers 6 and the winding elements 7 and 8 during the winding operation at a comparatively high speed, the time required for winding is reduced to a fraction of the time required to form the bale.

When the winding space 5 is completely filled and the bale is being bound with twine or wire, a second signal is automatically provided for the tractor driver, who then actuates the two hydraulic rams 31 so that the door 7, 30 is turned upwards into the position indicated by broken lines in FIG. 1. It is found that completed bales in the winding space press laterally against the side walls 4 of the winding space 5 to an extent such that, with known balers of this kind it is difficult to remove the bale from the baler without the need for additional measures. However, in the balers shown in the Figures, this inconvenience is avoided by utilizing this very lateral clamping of the bale between the side walls. Since the rear sections 30 of the two side walls 4 of the winding space 5 are larger in area than the stationary front sections 29 of the side walls, the bale, because it is clamped between the two rear sections 30, is drawn rearwardly and upwardly by the door 7, 30 as it opens under the action of the hydraulic rams 31, and is thus displaced through the outlet opening thus formed. Discharge of the bale is further assisted because the rear driving roller 6 is at a lower level than the front roller 6. Since the door 7, 30 turns upwardly to the rear, the bale will drop to the ground under its own weight from between the rear sections 30 of the side walls. The door 7, 30 thus serves as an extracting member for the bale.

As the door 7, 30 turns upwardly about the shaft 21, the fastening point 40 of the cable 38 also turns rearwardly and upwardly, and the cable 38 is tightened so that the lever 37 (FIG. 2) of the switchable gearbox 12 is turned from the right position back into the left position as shown in FIG. 2. As a result the lower speed for forming the next bale is automatically set. The return movement of the lever 37 displaces the cable 36 and hence the branch to the binding device so as to terminate operation of the binding device and to actuate a cutting mechanism to sever the twine.

After the completed bale has dropped from the door 7, 30 onto the field, the driver closes the door by operating the hydraulic rams 31 to return them to the position indicated in FIG. 1 by solid lines, after which the next bale can be formed.

The features shown in FIGS. 3 and 4 will now be described. The rear winding elements 7 of FIG. 3 comprise a plurality of bars 41 disposed between the two side walls 4 and extending at right angles to the direction A. The bars 41 are parallel to and spaced apart from each other and are provided at each end with a roller 42. Each roller 42 is located in a channel-shaped profile 43, which is rigidly secured to the inner face of the rear section 30. As viewed from the side (FIG. 3) each channel shaped profile 43 is arcuate. The rollers 42 running in each profile 43 are interconnected by chains emerging at the top ends of the profiles 43 to pass over sprockets 44, which can be driven by the shaft 21 which is powered from the sprocket 20 driven by chain 19. The chains, the rotatable rollers 43 and the bars 41 are guided back on the rear of the profiles 43 in channel shaped profiles 45 which are in contact with the rear sides of the profiles 43 and are rigidly secured to the side wall sections 30. The profiles 45 terminate in the lower regions of the wall sections 30 near the periphery of idle sprockets 46, which guide the chains and the bars 41 back into the profiles 43. The sprockets 46 are journalled in the pivotable rear sections 30 so that all of the transporting rear winding elements 7 formed by the bars 41 are pivotable about the shaft 21. By means of the drive described above, the bars 41, forming crop displacing members, are driven in the clockwise direction when they travel along the inner profile 43.

The front winding elements 8 are constructed in the same manner as the rear elements 7. The winding elements 8 are again in the form of bars 41, and those which face into the winding space 5 also lie on an arcuate path which, as shown in the side elevation of FIG. 3, follows the same arc as the inner run of the elements 7. The winding elements 8 also constitute a conveyor. The crop displacing members 41 are also driven clockwise, i.e. in the direction B. The front winding elements 8 formed by the bars 41 are supported by the fixed side wall sections 29, but they can pivot with respect to the sections 29 about the shaft 22, which serves as the driving shaft for the winding elements 8. This means that the profiles 43 and 45 (similar to those of the rear winding element 7), together with the chains, rollers 42 and bars 41 movable therein are pivotable about the shaft 22. The winding elements 8 can thus turn between the position indicated in FIG. 3 by broken lines and the position indicated in FIG. 3 by solid lines. The winding elements 8 tend to move towards the latter position under their own weight. Therefore, the profiles 43 and 45, which are not fastened rigidly to the side wall sections 29 and which support the front winding elements 8 constitute a frame for the displaceable components. The chains to which the bars 41 are fastened pass at the bottom (in the position indicated by broken lines in FIG. 3) around the sprocket 47 fastened to the shaft 22 and are driven by that sprocket. At the top (in the position indicated by broken lines) the chains each run over an idle sprocket 48 journalled on the profiles 43 and 45. The winding elements 8 occupy one quarter or more of the cylindrical boundary of the winding space 5.

Near the top of the foremost winding elements 8 in their upwardly pivoted position, there is an end switch 49 which is mounted on the fixed part of the baler. The actuating lever of the switch 49 is engageable by the profile 45 of the winding elements 8. A switch similar to the switch 49 may also be provided in the embodiment of FIG. 4.

During operation, the baler is moved in the direction A across the field, and the pick-up device 3 is driven in the direction D. The crop lying on the field, for example, grass, hay or straw is passed through the inlet opening 25 and travels along the lower driving rollers 6, driven in the direction E, up to the lower end of the rear winding elements 7. At the beginning of bale formation, front winding elements 8 are turned by their own weight about the shaft 22 into the position indicated in FIG. 3 by solid lines, which position is determined by a stop (not shown). The rear free end of the winding elements has turned in this position beyond the centerline of the winding space 5 through an angle of 45° or more. The length of the winding elements 8 is 150 centimeters or more.

The bars 41 of the rear winding elements 7 tend to convey the crop upwards, but at the beginning of bale formation the crop drops back below the rear end of the elements 8, where it forms the beginning, or core of the bale to be formed. Since crop is continuously supplied, the crop coils up on the driving rollers 6, on the lower part of the winding elements 7 and below the rear part of the winding elements 8. As the bale grows it pushes the winding elements 8 upwards in the direction C. The winding elements 8 move upwards, but their weight continues to press down on the outer side of the growing bale so that the outside of the bale is continuously compressed and hard layers are formed. This process continues until the winding space 5 is almost filled with the bale and the winding elements 8 have almost reached the position indicated by broken lines. The electrical end switch 49 has two switching conditions.

The winding elements 8 first put the switch 49 into a first switching condition, in which an electric or acoustic signal is generated which is perceptible to the tractor driver. Then, as stated above, the driver actuates the binding mechanism so that twine, wire or the like is wound around the cylindrical circumference of the bale, while at the same time by means of the cable 36, the gearbox 12 appreciably raises the driving speed of the lower driving rollers 6, the rear winding elements 7, the front winding elements 8 and the driving roller 24, while the bale is being bound, as stated above. During this operation the bale continues rolling until the profile 45 of the front winding elements 8 further displaces the actuating lever of the end switch 49 to bring it into a second switching condition in which another electric or acoustic signal is produced near the tractor driver. The driver then actuates the hydraulic ram 31 so that the door 7,30 turns about the shaft 21 and the completed bound bale is discharged from the baler as stated above. As the door opens, the lever 37 of the gearbox 12 (FIG. 2) is moved, as described above, by the cable 38 into the position shown in FIG. 2 so that the lower driving speed of the driving rollers 6, the coiling elements 7 and 8 and the pressing roller 14 is resumed for winding up a new bale. Also the binding operation stops and the twine is severed. The formation of the next bale then begins the winding elements 8 having returned under their own weight to the position indicated by solid lines in FIG. 3 after the completed bale was discharged.

The mode of operation described above with reference to FIG. 3 also applies generally to the embodiment of FIG. 4, which also comprises the switch 49 although it is not shown. In the embodiment of FIG. 4 the structural design of the winding elements 7 and 8 differs from that of FIG. 3. Unlike the rear winding elements 7 of the embodiment of FIG. 3, the rear winding elements 7 are not displaceable together along the rear portion of the boundary of the winding space 5. Instead, they are in the form of a plurality of driveable rollers 50 having rotary axes which do not change their positions relative to the wall sections 30. Nine rollers 50 are shown in FIG. 4. The rollers 50 are drivable about the axes of respective shafts 51, which are horizontal and extend transversely of the direction A. The rollers 50 (like the winding elements 7 and 8 of FIG. 3) extend across the entire width between the side wall sections 30. The shafts 51 are journalled in those side wall sections and project at one side from the side wall section 30, that is to say from the section 30 which is not visible in FIG. 1. At the ends located outside the side wall section 30, the shafts 51 are provided with sprockets 52, which are rigidly secured to the associated shafts 51 and can be driven by a chain 53 which runs around the row of sprockets 52 and is situated on the outboard side of the side wall section 30. A run of the chain 53 extends from the lowermost sprockets 52 of the lower roller 50 directly and approximately diametrically across the winding space 5 back to the sprocket 52 secured to the shaft 21 of the uppermost roller. The chain is driven as indicated above with reference to FIG. 1 by means of the chain 19. The rollers 50, which are drivable in the direction F, pivot with the door 7, 30 when the baler is opened for discharging a bale.

The front winding elements 8 comprise rollers 50 identical to the rollers 50 of the rear winding elements 7. As shown in FIG. 5, the shafts 51 of the front rollers 50 are journalled on both sides in hollow carriers 54 which, as shown in the side elevation of FIG. 4, are arcuate, the radius of the arc corresponding to that of the maximum dimension of the winding space 5. The two carriers 54 disposed one at each end of the rollers 50 are fastened to the shaft 22, which is drivable as described with reference to FIG. 1; the front winding elements 8 are pivotable about the shaft 22 like the winding elements 8 of FIG. 3. In the carrier 54 on the side away from the side wall 4 which is visible in FIG. 1, the shafts 51 are provided with sprockets 55 over which runs a chain 56, which is drivable by the sprocket 16 and which passes back along smaller sprockets or supporting and tensioning rollers 57. The outboard sides of the carriers 54 closely adjoin the inner surfaces of the side wall sections 29, 30. The rollers 50 are driven in the direction G.

The rollers themselves comprise cage rollers extending across approximately the whole width of the winding space 5. Each roller 50 comprises polygonal partitions 58 which are rigidly secured to the stub shaft 51 (FIG. 5). As well as end partitions 58, there may be one or more intermediate partitions. Near the corners of the periphery of each partition 58 are arranged rod or preferably tubular elongate elements 59 (for example, eight), which are disposed on a cylindrical surface which is coaxial with the stub shafts 51 or which may extend helically surround the axis of the stub shafts 51. The elongate elements 59 of the rear winding elements 7 constitute crop displacing members and extend across the width between the side wall sections 30. The front winding elements 8, which are pivotable under their own weight, can be counterbalanced, if they exert too much weight, by tension springs 60 provided at both sides of the baler on the outboard sides of the side walls 4. The springs 60 engage stub shafts 61 fastened to the carriers 54 and projecting through a slot 62 centered on the axis of the shaft 22. As in the embodiment of FIG. 3, the free end of the winding element 8 is turned at the beginning of the winding process to a position beyond the centerline of the cylindrical winding space 5. Also, the winding elements 8 occupy one quarter or more of the boundary of the winding space and, measured along their curved extent, they have a length of 150 centimeters or more.

It will be appreciated that winding elements of the kind shown in FIG. 3 can be used with winding elements of the kind in FIG. 4 in the same baler.

FIG. 6 is a sectional view of the two-speed change-speed gearbox 12. The output shaft 11 of the driving casing 10 constitutes an input shaft of this gearbox and drives an annulus 63 fastened to the shaft 11. The annulus 63 is provided near its outer periphery with internal teeth which is in mesh with the teeth of a number of planet wheels 64, the shafts of which are journalled on one side in a planet carrier 65 and on the other side in a supporting ring 66. The planet carrier 65 is rigidly mounted by means of axial splines on an intermediate shaft 67, which is coaxial with the shaft 11. The planet wheels 64 are in mesh with a sun wheel 68, which is mounted by axial splines on a sleeve 69, which is freely rotatable on the intermediate shaft 67. A ring 70 is rigidly secured to the sun wheel 68, and is provided at its outer periphery with teeth 71. A second ring 72 is rotatably supported on a sleeve-like extension of the sun wheel 68, by means of bearings 73. The ring 72, which has the same diameter as the ring 70, is also provided on the outer side with teeth 74. The ring 72 serves as a planet carrier, in which shafts of planet wheels 75 are rotatably journalled, these shafts also being supported by a supporting 76A. The planet wheels 75 are in mesh with teeth on the outer periphery of the sleeve 69, which constitutes, in common with the wheel 68, a sun wheel. The planet wheels 75 are in mesh on the outside with internal teeth at the periphery of an annulus 76, which is rigidly secured by axial splines on the intermediate shaft 67. A sun wheel 77 is rigidly secured to the intermediate shaft 67 at its end away from the shaft 11. This sun wheel 77 is in mesh with planet wheels 78, which are in mesh on the outside with internal teeth on a housing 78A of the gearbox 12. The shafts of the planet wheels 78 are supported by a planet carrier 79, which is rigidly secured by means of axial splines to the output shaft 13, which is coaxial with the shafts 11 and 67. The sprocket 14 is fastened to the shaft 13.

When the annulus 70 is locked with respect to the housing 78A by means of its teeth 71 in a manner to be described later, the sun wheel 68 and hence also the sleeve 69 are locked. If the shaft 11 then drives the annulus 63, this drives the planet carrier 65 through the planet wheels 64, and hence also the intermediate shaft 67. The drive of the shaft 67 is transmitted by the sun wheel 77, the planet wheels 78 and the stationary annulus constituted by the teeth on the housing 78A to the planet carrier 79 and hence to the shaft 13 and the sprocket 14. Under these conditions, the annulus 72, the planet wheels 75 and the annulus 76 rotate idly.

When the annulus 70 is released and the annulus 72 is locked with respectl to the housing 78A by means of its teeth 74, the driven annulus 63 rotates the planet wheels 64, the planet carrier 65, the sun wheel 68 and the sleeve 69 which is rigidly secured to the sun wheel 68. The sleeve 69 drives the planet wheels 75 and hence the annulus 76. The planet carrier 72 is stationary because it is locked. An intercoupling of the planetary systems occurs because the planet carrier 65 and the annulus 76 are both rigidly coupled to the intermediate shaft 67 so that they rotate at the same speed. Under these conditions, the speed of the intermediate shaft 67 is fixed. The drive of the intermediate shaft 67 is again transmitted by the gear wheels 77 and 78 through the planet carrier 70 to the shaft 13 and hence to the sprocket 14.

Locking of the annulus 70 or 72 is achieved, as indicated at the top of the sectional view of FIGS. 6, by operation of the lever 37. The lever 37 is mounted directly or indirectly on a selector shaft 81 which crosses the shaft 11 and is journalled in the housing 78A. The shaft 81 is provided with two rigidly interconnected arms 82 and 83, which are rigidly secured together to the shaft 81 and constitute a pawl mechanism. At the end away from the shaft 81 the arms 82 and 83 are provided with respective teeth 84 and 85, each of which can engage in teeth 74 and 71 respectively. An arm 86 is rigidly secured to the arms 82 and 83, and is disposed so that it is directed away from the arms 82 and 83 centrally between them. At the end away from the shaft 81, the arm 86 carries a shaft 87, about which one end of a rod 88 is pivotable. The other end of the rod 88 is slidably received in a sleeve 89, which is pivotable with respect to the housing 78A about a rocking shaft (not shown) which is parallel to the shafts 81, 87. Between the sleeve 89 and a shoulder on the rod 88 near the shaft 87 there is a compression spring 90 which acts to slide the rod 88 out of the sleeve 89. In the position shown in FIG. 6, the tooth 84 engages the teeth 74. When the arm 82 is pivoted out of engagement by turning the shaft 81, the arm 83 and its tooth 85 engages the teeth 71 of the annulus 70. Each of these two positions is stable during operation because the pivotal shaft 87 is situated to one side or the other of the plane containing the centerline of the shaft 81 and the axis about which the sleeve 89 is pivotable. Thus, in each of the two operative positions, the shaft 87 is disposed away from the dead point, in which the three shafts lie in the same plane. The spring 90 provides an overcenter action to ensure stable engagement of the annuli 70 and 72 respectively. In this way two transmission ratios can be obtained dependent on the proportioning of the components, the transmission ratios between the shaft 11 and the sprocket 14, and the ratios mentioned above.

Although various features of the balers described and illustrated in the drawings, will be set forth in the following claims as inventive features, the invention is not necessarily limited to these features and may encompass all inventive features disclosed both individually and in various combinations.

Having disclosed my invention, what I claim as new and to be secured by Letters Patent of the United States is:

1. A baler comprising a pick-up device for picking up crop lying on the ground, a bale forming space provided with winding elements, a means for driving said winding elements at at least two different speeds, a binding means for winding binding material around a formed bale, and a coupling means for simultaneously actuating said binding means and selecting a driving speed of said winding elements which exceeds the speed maintained while forming the bale.

2. A bailer as claimed in claim 1, further comprising a two-speed change-speed gearbox through which said winding elements are drivable.

3. A baler as claimed in claim 2, in which said winding elements are further comprised of a floor element, a rear winding element, and a pivotable front winding element.

4. A baler as claimed in claim 2, in which said winding elements are drivable about substantially horizontal axes extending transversely of the intended direction of operative travel of the baler.

5. A baler as claimed in claim 1, in which said gearbox is adapted to be changed over while under load.

6. A baler as claimed in claim 1, further comprising a gedarbox through which said winding elements are drivable, said coupling means comprising an elongate flexible element which is operable from a tractor drawing the baler and which is connected to a control member of said gearbox and to said binding means.

7. A baler as claimed in claim 6, in which a pivotable section partly defines said bale forming space and provides an outlet opening for a completed bale when opened, said elongate flexible element being connected to said pivotable section.

8. A baler as claimed in claim 7, in which said pivotable section, when opened or partly opened, operates the control member through said elongate flexible element to place it in the position suitable for bale forming.

9. A baler as claimed in claim 7, further comprising a cutting member for severing said binding material, which said pivotable section, when open or partly open, deactuates said binding means through said elongate flexbible element and actuates said cutting member.

10. A baler as claimed in claim 1, in which at least one of said winding elements is provided with drivable elongate crop displacing members which are rotatable about an axis.

11. A baler as claimed in claim 1, further comprising two spaced side walls defining said bale forming space, in which said winding elements extend across the width between said two spaced side walls.

12. A baler as claimed in claim 1, in which the width of winding elements is at least about 150 centimeters.

13. A baler as claimed in claim 1, in which said winding elements, during bale formation, define a substantially cylindrical boundary of said bale forming space.

14. A baler as claimed in claim 13, in which, during bale formation about one quarter or more of said cylindrical of said bale forming space is pivotally mounted with respect to the rest of the baler.

15. A baler as claimed in claim 1, in which at least one of said winding elements is tubular and coaxial with a drivable shaft.

16. A baler as claimed in claim 1, in which at least one of said winding elements comprises an endless conveyor.

17. A baler as claimed to claim 1, comprising an inlet for crop and wherein said bale forming space has a substantially cylindrical boundary in which, apart from said inlet opening for crop, said winding elements cover substantially the entire cylindrical boundary of said bale forming space.

18. A baler as claimed in claim 1, in which said bale forming space has a diameter of about 150 to 180 centimeters.

19. A baler as claimed in claim 1, in which the width of said bale forming space is about 120 to 150 centimeters.

20. A baler as claimed in claim 1, comprising chain transmissions, said winding elements being drivable by means of said chain transmissions.

21. A baler for forming compact cylindrical bales of substantial size composed of material such as hay, which comprises:
   a pick-up device;
   a cylindrical bale coiling space which is defined by forward and rear walled portions for receiving material conveyed to it from said pick-up device;
   bale winding elements provided for said forward and rear walled portions;
   a means powered by a tractor or other such vehicle for driving said bale winding elements including change speed means so that said bale winding elements have at lease two driving speeds where said change speed means is adapted to cause said driving means to turn said winding elements at the higher of said speeds when a bale is substantially formed in said bale coiling space for rapidly beinding the bale;
   a bale binding means for binding bales which have been formed in said bale coiling space;
   a cutting means for severing material used to bind the bales;
   an operating means for controlling said change speed means such that a tractor driver can adjust the speed of the winding elements to a higher speed for bale binding;
   and means for pivoting said rear walled portion of said bale coiling space to displace said bale to the rear and being operatively connected with said change speed means to adjust the speed of the winding elements to the lower speed suitable for bale formation.

22. A baler as claimed in claim 21 wherein when said rear walled portion is pivoted said cutting means is actuated.

* * * * *